Figure 1:
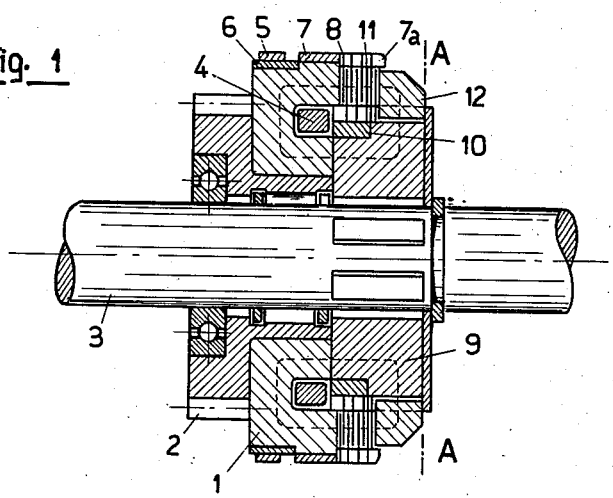

June 12, 1945.  A. RYBA  2,378,108

ELECTROMAGNETIC MULTIPLE-DISK CLUTCH

Filed Jan. 16, 1940  2 Sheets-Sheet 1

Inventor,
A. Ryba
By Glascock
Downing & Seebold Attys

June 12, 1945. A. RYBA 2,378,108
ELECTROMAGNETIC MULTIPLE-DISK CLUTCH
Filed Jan. 16, 1940 2 Sheets-Sheet 2

Inventors,
A. Ryba
by Glascock Downing & Seebold
Attys.

Patented June 12, 1945

2,378,108

UNITED STATES PATENT OFFICE 2,378,108

ELECTROMAGNETIC MULTIPLE-DISK CLUTCH

Anton Ryba, Bolzano, Italy; vested in the Alien Property Custodian

Application January 16, 1940, Serial No. 314,170
In Germany July 29, 1937

2 Claims. (Cl. 192—84)

The present invention relates to an electromagnetic multiple disk clutch as used essentially in motor vehicles for effecting change of gear.

Clutches of this kind must be of simple construction and yet of high specific efficiency.

The object of the present invention is to provide a multiple disk clutch fulfilling to a high degree both of the above mentioned conditions.

To this end I propose to arrange in combination: a pair of clutch members, an electromagnet provided at one of said clutch members, a set of ferromagnetic friction disks in front of one of the two pole surfaces of said electromagnet, a sleeve of ferromagnetic material for guiding the magnetic flux, said sleeve having a toothing or notching respectively for receiving a set of said friction disks and the armature having a toothing or notching fitting the toothing or notching respectively of the above mentioned sleeve, and means for conducting the magnetic flux principally in axial direction through the packet of disks. This flux guiding means may comprise a ring of non-magnetic material connected to the ferromagnetic sleeve, having a common toothing or notching respectively for receiving a set of said friction disks, and an extension of one set of disks beyond the pole surface into the zone of the exciting coil, advantageously provided in this zone with a row of perforations or recesses forming air gaps for the purpose of improving the magnetic insulation.

Clutches of this kind are of particular simple construction and yet have the advantage of easily carrying off the heat from the friction disks, so that such clutches are free of heat stresses and warpings.

In the accompanying drawings a clutch according to the invention is shown by way of example.

Figure 2:
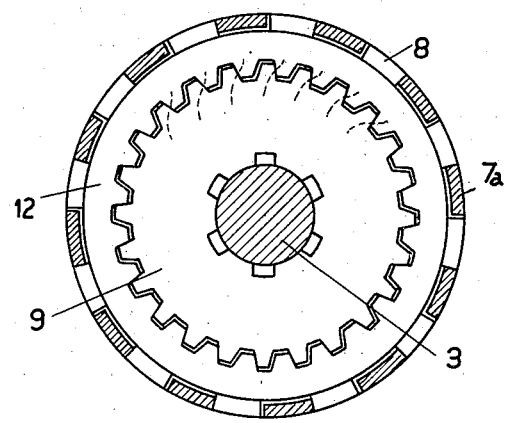
Figure 3:
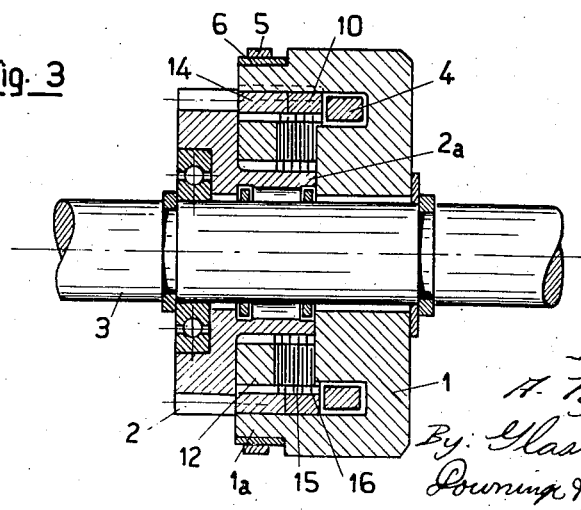
Figure 4:
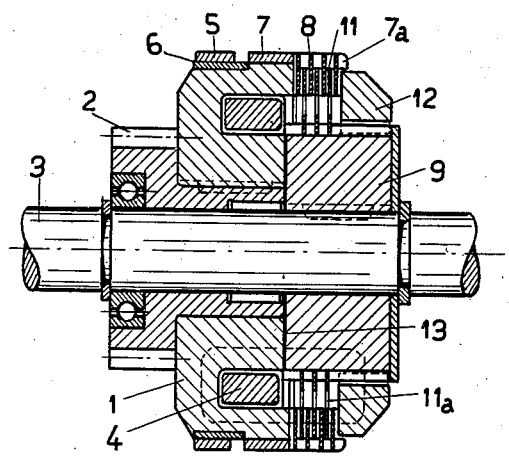
Figure 5:
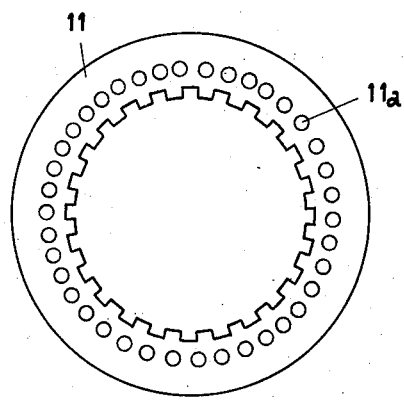

In the drawings:

Fig. 1 is a longitudinal section through a clutch with the disks in front of the outer pole surface, Fig. 2 is a front-view of the clutch of Fig. 1, Fig. 3 is a longitudinal section through a clutch with the disks in front of the inner pole surface, Fig. 4 is a longitudinal section through a clutch with one set of disks extending into the zone of the exciting coil, Fig. 5 is an elevation of an inner disk having perforations, belonging to Fig. 4.

Figure 6:
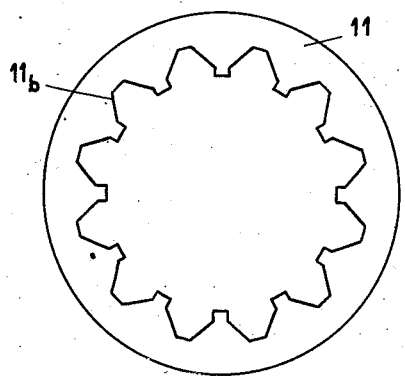
Figure 7:
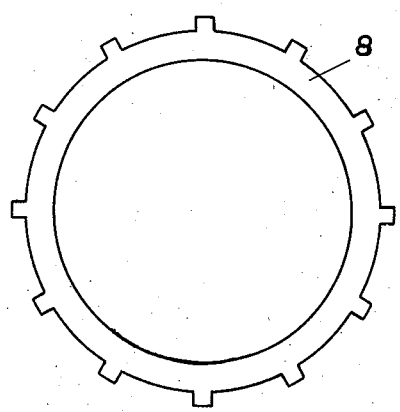

Fig. 6 is an elevation of an inner disk provided with elongated teeth, belonging to Fig. 4, Fig. 7 is an elevation of an outer disk, belonging to Fig. 4.

Rotatably mounted upon a shaft 3 (Fig. 1) is a gear wheel 2 upon which an annular electromagnet 1 is fixed, in the annular space of which an exciting coil 4 is located. The terminals of the exciting coil 4 are connected to mass on the one hand and to a slip-ring 5 on the other hand, said ring being insulated from electromagnet 1 by a suitable insulating material 6. Also fixed upon the electromagnet is a ring 7 having claws 7a into which engage the outer thin springy disks 8. Mounted upon the shaft 3 is a sleeve 9 consisting of ferromagnetic material. Sleeve 9 is secured against relative rotation to shaft 3, said sleeve being rigidly connected to a non-magnetisable ring 10 for the purpose of effecting a magnetic insulation. Ring 10, at its outer circumference, has a common toothing or notching with the ferromagnetic portion of the sleeve 9, into which engage the inner thin springy disks 11 and the armature 12 by means of a suitable toothing or notching. For the purpose of obtaining the desired effect such toothing or notching must be so constructed that surface contact occurs between the flanks of the teeth of the armature and those of the sleeve, so that passage of the magnetic flux may be effected without air gaps (Fig. 2).

In Fig. 3, upon the shaft 3 is fixed an annular electromagnet 1, the outer pole 1a of which is extended and carries a non-magnetisable ring or sleeve 10 and a ferromagnetic ring or sleeve 14, both of them secured to it. Said rings 10 and 14 at their inner circumference have a common toothing or notching, in which engage the outer thin springy disks 16 and the armature 12. The non-magnetisable ring 10 (also in Fig. 1) has nearly the breadth of the packet of disks when compressed. The gear wheel 2 is rotatably mounted upon the shaft 3 and possesses a toothed boss 2a in which engage the inner thin springy disks 15.

Fig. 4 differs from Fig. 1 in that the inner disks 11 extend into the zone of the exciting coil, advantageously having in this zone a row of perforations 11a or recesses 11b (see Fig. 6) for the purpose of improving the magnetic insulation. To the shaft 3 the ferromagnetic sleeve 9 is rigidly connected, having at its outer circumference a common toothing or notching, in which engage the inner disks 11 and the armature 12. The armature 12 at its inner circumference has a toothing or notching, fitting to the sleeve 9 in such a manner, that surface contact occurs between the flanks of the teeth of the armature and those of the sleeve, in order to reduce the magnetic resistance of the flux passage between the armature and the sleeve as far as possible. Figure 2 of the first form of the invention clearly illustrates the meshing of toothed members 9 and 12.

The disks 8 not extending into the zone of the exciting coil, are in all constructions normal narrow rings of plate, provided in a known manner with carriers for connecting them to one clutch member. Fig. 7 shows for example such a disk 8 as employed in Figs. 1 and 4.

Instead of consisting of one piece, the armature 12 may consist of individual disks.

The operation of the above described clutch is as follows:

If the circuit is closed, a magnetic field is produced in the sense of the dash line, which owing to the magnetic insulation through the non-magnetic ring 10, or through the air gaps in the zone of the exciting coil, traverses the set of disks mainly in an axial direction and passes between the armature and the sleeve mainly in a tangential direction on the flanks of the teeth, either on the one or on the other side according to the contact of the flanks at that moment. An iron closed path of the flux may be obtained, in spite of an easy axial displacement of the armature by this arrangement.

What I claim is:

1. An electro-magnetic multiple-disk clutch comprising a pair of clutch members, an annular electro-magnet having an exciting winding forming part of one of said clutch members, a sleeve made of ferro-magnetic material forming part of the other clutch member provided adjacent and opposite to one of the poles of said electro-magnet, a second sleeve made of non-magnetic material and enclosing part of said sleeve of ferromagnetic material and aligned with the zone of said exciting winding, a common axially directed toothing on the outer perimeter of said two sleeves, an armature for closing the magnetic flux having an axially directed toothing adapted to engage the toothing of said sleeve made of ferro-magnetic material, the flanks of said toothings being arranged to engage each other when said armature is sliding on said sleeve of ferro-magnetic material, an outer set of thin springy disks made of ferro-magnetic material located between said armature and the second pole of said electro-magnet, teeth on the outer perimeter of each disk in the outer set for connecting said disks to the clutch member with the electro-magnet, an inner set of thin springy disks made of ferro-magnetic material located between said armature and said second pole of said electro-magnet, the disks of the inner set alternating with the disks of the outer set and teeth on the inner perimeter of each disk in the inner set engaging said common toothing said common axial direction of the toothing permitting some of said inner disks to slide back and forth between said ferro-magnetic and said non-magnetic sleeves, said disks of said inner set and said outer set leaving air gaps between two adjacent disks when demagnetized and adapted to bear against each other by yielding in response to the increasing axial pressure of the magnetic force due to their springiness thus substantially eliminating said air gaps.

2. In an electro-magnetic multiple-disk clutch having a rotary annular electro-magnet member with an exciting winding therein and a co-operating rotary member, a coupling between said electromagnet member and said cooperating member, comprising a sleeve made of ferro-magnetic material, a second sleeve made of non-magnetic material secured to said ferro-magnetic sleeve, said second sleeve being alined with the zone of said exciting winding, a common axially directed toothing on the perimeter of said two sleeves, a set of thin springy annular disks made of ferro-magnetic material, a second set of thin springy annular disks of ferro-magnetic material alternately spaced with said first set, an armature disposed between said ferro-magnetic sleeve and said two sets of disks, said ferro-magnetic sleeve being disposed opposite one of the poles of said electro-magnet member and said sets of disks being disposed opposite the other pole to thereby complete the path of magnetic flux, said ferro-magnetic sleeve also being secured to one of said rotary members, axially directed toothing on said armature engaging the toothing on said ferro-magnetic sleeve, the flanks of said armature teeth and ferro-magnetic sleeve toothings being arranged to engage each other when the armature slides on said ferro-magnetic sleeve, a toothed connection between one of said sets of springy disks and said common toothing to connect said coupling with one of said rotary members, said common axial direction of the toothing permitting some of the associated toothed disks to slide back and forth between said magnetic and said ferro-magnetic sleeves, and a second toothed connection between the other set of spring disks and said other rotary member, said sets of disks leaving air gaps therebetween when demagnetized and adapted to bear against each other by yielding in response to the increasing axial pressure of the magnetic force due to their springiness thus substantially eliminating said air gaps.

ANTON RYBA.